(12) United States Patent
Meynen et al.

(10) Patent No.: US 12,339,524 B2
(45) Date of Patent: Jun. 24, 2025

(54) EYEWEAR SKELETON

(71) Applicant: Essilor International, Charenton-le-pont (FR)

(72) Inventors: Mathieu Meynen, Charenton-le-Pont (FR); Ludovic Jouard, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 607 days.

(21) Appl. No.: 16/629,871

(22) PCT Filed: Jul. 10, 2018

(86) PCT No.: PCT/EP2018/068687
§ 371 (c)(1),
(2) Date: Jan. 9, 2020

(87) PCT Pub. No.: WO2019/011925
PCT Pub. Date: Jan. 17, 2019

(65) Prior Publication Data
US 2021/0149216 A1    May 20, 2021

(30) Foreign Application Priority Data
Jul. 11, 2017  (EP) ..................... 17305901

(51) Int. Cl.
*G02C 5/20* (2006.01)
*G02C 11/00* (2006.01)
(52) U.S. Cl.
CPC ............. *G02C 5/20* (2013.01); *G02C 11/10* (2013.01)

(58) Field of Classification Search
CPC ........... G02C 5/20; G02C 11/10; G02C 7/101
See application file for complete search history.

(56) References Cited

U.S. PATENT DOCUMENTS 5,381,192 A * 1/1995 Canavan ................ G02C 5/20
351/111
5,835,185 A   11/1998 Kallman et al.
(Continued)

FOREIGN PATENT DOCUMENTS

WO   WO 2013/188805 A2   12/2013
WO   WO 2016/162901 A1   10/2016

OTHER PUBLICATIONS

International Search Report and Written Opinion issued on Aug. 6, 2018 in PCT/EP2018/068687 filed on Jul. 10, 2018.
(Continued)

*Primary Examiner* — Balram T Parbadia
*Assistant Examiner* — Gabriel A Sanz
(74) *Attorney, Agent, or Firm* — Oblon, McClelland, Maier & Neustadt, L.L.P.

(57) ABSTRACT

The present disclosure relates to an eyewear skeleton to be integrated into an active eyewear adapted for a wearer, including at least two elements selected among the following elements: a lens housing, and/or at least one temple, and/or at least one optical lens. At least part of the two elements is to be dressed by at least one dressing element, each of the at least two elements including at least one electronic component, the at least one electronic component of the at least two elements interacting one with the other.

16 Claims, 4 Drawing Sheets

(56) References Cited

U.S. PATENT DOCUMENTS

| | | | |
|---|---|---|---|
| 5,909,267 A * | 6/1999 | Hall | A61F 9/028 |
| | | | 351/120 |
| 8,944,590 B2 | 2/2015 | Blum et al. | |
| 9,482,880 B1 * | 11/2016 | Chandrasekhar | G02F 1/155 |
| 2007/0200998 A1 | 8/2007 | Schrimmer et al. | |
| 2010/0110368 A1 * | 5/2010 | Chaum | G02C 11/10 |
| | | | 351/158 |
| 2012/0127423 A1 * | 5/2012 | Blum | G02C 7/083 |
| | | | 351/158 |
| 2012/0133883 A1 | 5/2012 | Mezher | |
| 2014/0008966 A1 | 1/2014 | Hotani et al. | |
| 2014/0028966 A1 | 1/2014 | Blum et al. | |
| 2014/0078462 A1 * | 3/2014 | Abreu | H04R 1/1016 |
| | | | 351/158 |
| 2014/0146282 A1 | 5/2014 | Lu | |
| 2016/0026009 A1 * | 1/2016 | Urbajs | G02F 1/1313 |
| | | | 349/13 |
| 2016/0103339 A1 * | 4/2016 | White | G02C 5/02 |
| | | | 351/158 |
| 2016/0187654 A1 * | 6/2016 | Border | G02B 27/0172 |
| | | | 359/630 |
| 2016/0223820 A1 * | 8/2016 | Chow | G02C 5/04 |
| 2016/0246059 A1 * | 8/2016 | Halpin | G02B 27/0176 |
| 2017/0031181 A1 | 2/2017 | Blum et al. | |
| 2017/0075141 A1 | 3/2017 | Blum et al. | |

OTHER PUBLICATIONS

Office Action issued Oct. 4, 2024 in European Patent Application No. EP 18738320.3.

* cited by examiner

EYEWEAR SKELETON

FIELD OF THE INVENTION

The invention relates to an eyewear skeleton, intended to be integrated into an active eyewear adapted for a wearer.

The invention further relates to an active eyewear adapted for a wearer comprising the eyewear skeleton.

The invention further relates to a method for assembling the active eyewear adapted for a wearer.

The invention further relates to a method for adjusting the active eyewear to a wearer.

BACKGROUND OF THE INVENTION

Usually, it exists active eyewears comprising a frame in which electronic components are integrated.

However, the integration of the electronic components, while proposing a customization of the frame to the wearer, is difficult. Indeed, the different frames proposed to the wearer generally have different shape, and thus, the electronic components cannot be easily integrated in the different frames.

Thus, there is a need for a device which allows both an easy integration of electronic components on a frame of an active eyewear and designing different shapes of such active eyewear.

One object of the invention is to provide such device.

SUMMARY OF THE INVENTION

To this end, the invention proposes an eyewear skeleton, intended to be integrated into an active eyewear adapted for a wearer, comprising at least two elements selected among the following elements:
  a lens housing, and/or
  at least one temple, and/or
  at least one optical lens,
at least part of the two elements being intended to be dressed by at least one dressing element,
wherein each of the at least two elements comprises at least one electronic component, the at least one electronic component of the at least two elements interacting one with the other.

Advantageously, the electronic components are easily integrated in the eyewear skeleton according to the invention, and more precisely in the active eyewear in which the eyewear skeleton is intended to be integrated.

In the sense of the invention, the term "eyewear skeleton" refers to a subset supporting structure forming the main body of the active eyewear.

Moreover, the eyewear skeleton according to the invention allows providing an active eyewear more adapted to the wearer's needs and preferences. Indeed, the eyewear skeleton is intended to be dressed by one or more dressing elements which can have different shape, color or material for instance according to the wearer's choices. Plus, the wearer can choose the electronic components of the eyewear skeleton according to his needs and/or preferences, and such electronic components are easily integrated in the eyewear skeleton.

Additionally, the eyewear skeleton according to the invention allows having a larger range of active eyewears relative to the prior art with a reduced number of eyewear skeletons in stock.

According to embodiments, the eyewear skeleton according to the invention may further comprise one or several of the following features according to any possible combination:
  the at least two elements are the lens housing and the at least one temple and/or the at least one optical lens, the lens housing being configured to be coupled to the at least one temple and/or to support the at least one optical lens; and/or
  the electronic component comprises a battery and/or an electronic board and/or a wire and/or a sensor and/or an optical element for performing augmented reality and/or a memory and/or a processor and/or a cooling component and/or an active cell; and/or
  one of the at least two elements is the lens housing, the at least one electronic component of the lens housing comprises an active lens; and/or
  the eyewear skeleton comprises mechanical means arranged between the electronics components and the at least two elements; and/or
  the mechanical means comprise hinges and/or wires and/or holding means; and/or
  the at least two elements are made of plastic and/or metal; and/or
  the eyewear skeleton comprises:
    a lens housing,
    two temples coupled to the lens housing, and
    two optical lenses supported by the lens housing,
    at least part of the lens housing, the two temples and the two optical lenses being intended to be dressed by at least one dressing element, wherein the lens housing comprises at least one electronic component, the two temples comprise at least one electronic component and the two optical lenses comprise at least one electronic component, the at least one electronic component of the lens housing, of the two temples and of the optical lenses interacting one with the other; and/or
  at least one of the at least two elements is adjustable so that the eyewear skeleton is adapted to the wearer; and/or
  the eyewear skeleton comprises mechanical means for adjusting at least the lens housing and/or the at least one temple according to at least one parameter of the wearer; and/or
  the at least one parameter of the wearer relates to the pantoscopic angle fitting the wearer's face and/or the wrap angle fitting the wearer's face and/or the curvature angle of the wearer and/or the interpupillary-distance of the wearer and/or a parameter relative to the head of the wearer, such as the nose size and/or the nose position and/or an eyebrow position and/or a jowl position, and/or the width of the wearer's head and/or a parameter relative to the wearer's head movements; and/or
  the at least two elements are the lens housing and the at least one temple, the eyewear skeleton further comprises mechanical means for adjusting at least one of the at least two elements according to the optical lenses to be provided to the wearer.

Advantageously, the eyewear skeleton according to the invention is easily adjusted to the wearer, for instance to the wearer's face or to the wearer's preferences, and thus allows obtaining an active eyewear more adapted to the wearer.

The invention further relates to an active eyewear adapted for a wearer comprising:
  the eyewear skeleton according to the invention, and at least one dressing element,
wherein the at least one dressing element dresses at least part of the at least two elements of the eyewear skeleton.

Advantageously, the electronic components are easily integrated in the active eyewear according to the invention, regardless the shape of the dressing element.

Moreover, the active eyewear according to the invention is easily adjusted to the wearer, for instance to the wearer's face or to the wearer's preferences.

Furthermore, the active eyewear according to the invention is more adapted to the wearer's needs and preferences, since the eyewear skeleton is dressed by one or more dressing elements which can be from different shape, color or material for instance according to the wearer's choices. Plus, the wearer can choose the electronic components of the eyewear skeleton according to his needs and/or preferences, and such electronic components are easily integrated in the active eyewear.

According to embodiments, the active eyewear according to the invention may further comprise one or several of the following features according to any possible combination:
the at least one dressing element is adjustable; and/or
the at least one dressing element is adjusted according to at least one parameter of the wearer; and/or
the at least one parameter of the wearer relates to the position of the eyewear skeleton relative to the wearer and/or to wearer's preferences, and wherein the active eyewear forms a frame comprising the eyewear skeleton and the at least one dressing element, the at least one parameter of the wearer relates to the pantoscopic angle fitting the wearer's face and/or the wrap angle fitting the wearer's face and/or the length of the temples of the eyewear skeleton and/or the distance between the temples; and/or
the at least one dressing element comprises nose pads and/or right and left temples and/or ears supports; and/or
the at least one dressing element is monobloc; and/or
the at least one dressing element comprises at least two parts; and/or
the at least two parts of the at least one dressing element are fixed together so that the at least two parts of the at least one dressing elements dress at least part of the at least two elements of the eyewear skeleton; and/or
the at least one dressing element is made of a sealing resin and/or of plastic and/or of metal and/or of wood; and/or
the active eyewear comprises a plurality of dressing elements, wherein the plurality of dressing elements dresses at least part of the at least two elements of the eyewear skeleton; and/or
the plurality of dressing elements comprises a first dressing element having a first configuration and a second dressing element having a second configuration, a configuration comprising parameters relative to a material and/or a color and/or a number of parts and/or a shape and/or fixation means to the eyewear skeleton, and wherein the first configuration is different from the second configuration; and/or
the at least one dressing element is fixed on the eyewear skeleton; and/or
the at least one dressing element dresses partially the eyewear skeleton; and/or
the at least one dressing element dresses completely the eyewear skeleton; and/or
the at least one dressing element comprises at least one aperture arranged on an area of the at least one dressing element dressing an electronic component.

Advantageously, the active eyewear according to the invention is easily adjusted to the wearer, for instance to the wearer's face or to the wearer's preferences. Hence, the active eyewear according to the invention is more adapted to the wearer and allows improving the comfort of the wearer compared with the active eyewear according to the prior art.

The invention further relates to a method for assembling an active eyewear adapted for a wearer comprising:
an eyewear skeleton providing step, during which an eyewear skeleton according the invention is provided,
a dressing element providing step, during which at least one dressing element is provided
a dressing step, during which at least part of the at least two elements of the eyewear skeleton are dressed by the at least one dressing element Advantageously, the eyewear skeleton and the dressing element are easily assembled to form the active eyewear according to the invention.

According to an embodiment, the at least one dressing element may comprise at least two parts, and during the dressing step of the method for assembling an active eyewear adapted for a wearer according to the invention, at least one of the at least two elements of the eyewear skeleton is at least partially dressed by one of the at least two parts of the at least one dressing element, and at least the other of the at least two elements of the eyewear skeleton is at least partially dressed by the other of the at least two parts of the at least one dressing element, such that the at least two parts of the at least one dressing element dresses the at least two elements of the eyewear skeleton.

The invention further relates to a method for adjusting an active eyewear to a wearer, comprising:
an active eyewear providing step, during which an active eyewear according to the invention is provided, at least one of the at least two elements of the eyewear skeleton and/or the at least one dressing element is adjustable so that the eyewear skeleton is adapted to the wearer,
an active eyewear adjusting step, during which the at least one of the at least two elements of the eyewear skeleton and/or the at least one dressing element is adjusted according to at least one parameter of the wearer.

Advantageously, the method for adjusting an active eyewear to a wearer according to the invention allows an easy adjustment of the active eyewear to the wearer's face. Hence, the method of adjusting allows providing an active eyewear more adapted to the wearer.

According to an embodiment, at least one of the at least two elements of the eyewear skeleton is adjustable, the eyewear skeleton of the active eyewear comprises mechanical means, and during the active eyewear adjusting step of the method for adjusting an active eyewear to a wearer according to the invention, the at least one of the at least two elements of the eyewear skeleton is adjusted with the mechanical means according to at least one parameter of the wearer.

BRIEF DESCRIPTION OF THE DRAWINGS

Other characteristics and advantages of the invention will become more apparent from the claims and from the following description of some embodiments given by way of example without limitation with reference to the drawings, in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

The invention relates to an eyewear skeleton intended to be integrated into an active eyewear adapted for a wearer. The active eyewear may be, for instance, active spectacle glasses.

Figure 1:
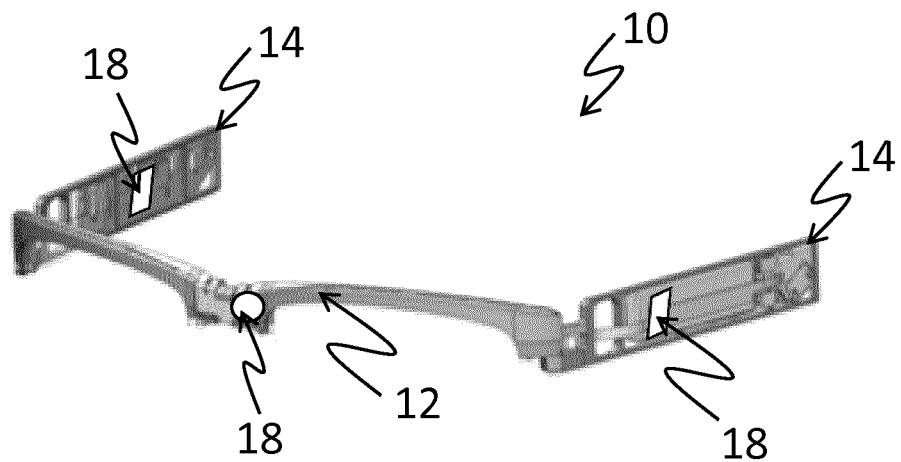
FIGS. 1 and 2 represent eyewear skeletons according to embodiments of the invention.
Figure 2:
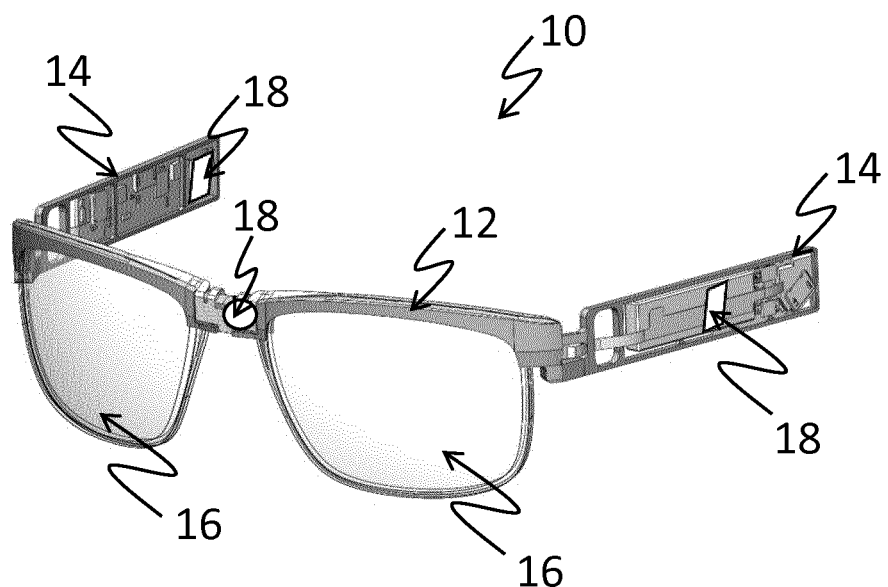

Eyewear skeletons 10 according to embodiments of the invention are represented in FIGS. 1 and 2.

The eyewear skeleton 10 comprises at least two elements selected among a lens housing 12, at least one temple 14, and at least one optical lens 16.

As represented in FIG. 1, the eyewear skeleton 10 comprises a lens housing 12 and right and left temples 14. The eyewear skeleton 10 represented in FIG. 2 comprises a lens housing 12, right and left temples 14 and right and left optical lenses 16.

In particular, the right and left temples 14 may be coupled to the lens housing 12. The right and left optical lenses 16 may be supported by the lens housing 12. In other words, the lens housing 12 may be configured to be coupled to at least one temple 14 and to support at least one optical lens 16.

The right and left temples 14 are configured to be attached to the lens housing 12, for example using hinges and screws.

The lens housing 12 may comprise frame rims arranged to receive optical lenses, for example ophthalmic lenses. The frame rims are linked by a bridge.

At least part of the two elements are intended to be dressed by at least one dressing element.

Advantageously, the eyewear skeleton allows providing an active eyewear more adapted to the wearer's needs and preferences. Indeed, the eyewear skeleton is intended to be dressed by one or more dressing elements which can have different shapes, colors or materials for instance according to the wearer's choices.

For instance, the temples 14 and the lens housing 12 of the eyewear skeleton 10 may be completely dressed by a dressing element.

The optical lenses may comprise a front surface, a back surface, and a peripheral surface joining the front and back surface. The peripheral surface of the optical lenses may be completely dressed by a dressing element, and only the peripheral area of the front and back surfaces of the optical lenses may be completely dressed by a dressing element.

The at least two elements of the eyewear skeleton 10 may be made of plastic and/or metal. For example, the elements of the eyewear skeleton 10 may be made of a magnesium alloy, an aluminum alloy, a titanium alloy, stainless steel, carbon filled plastics, glass filled plastics, or high stiffness thermoplastics. The elements of the eyewear skeleton 10 may be made of soft and flexible materials, such as rubber, thermoplastic elastomers (TPE), or polyurethane.

The eyewear skeleton is advantageously light so that the active eyewear worn by the wearer is light.

Each element of the eyewear skeleton 10 comprises at least one electronic component 18. For instance, each of the lens housing 12, the two temples 14 and the two optical lenses 16 may comprise at least one electronic component 18. Each element of the eyewear skeleton 10 may comprise a plurality of electronic components 18.

The electronic components 18 of the elements of the eyewear skeleton 10 are configured to interact one with the other. In other words, one electronic component 18 arranged on one element of the eyewear skeleton 10 is configured to interact with one electronic component 18 arranged on the other element of the eyewear skeleton 10.

The at least two electronic components 18 may interact one with the other via wires or Bluetooth. For instance, a hinge between a temple 14 and the lens housing 12 may comprise a wire that connects an electronic component 18 arranged on the temple 14 and an electronic component 18 arranged on the lens housing 12. The bridge of the lens housing 12 may comprise a wire that connects an electronic component 18 arranged on the right part of the lens housing 12 and an electronic component 18 arranged on the left part of the lens housing 12.

Advantageously, the eyewear skeleton allows providing an active eyewear more adapted to the wearer's needs and preferences. Indeed, the wearer can choose the electronic components of the eyewear skeleton according to his needs and/or preferences, and such electronic components are easily integrated in the eyewear skeleton.

The electronic components 18 may comprise a battery, an electronic board, a wire, a flexible cable, a memory, a processor, or an active or passive cooling component.

The electronic components 18 may comprise a secondary battery and an USB socket for charging the battery, or a wireless charging component.

The electronic components 18 may comprise a sensor, such as an ambient light sensor, a ultra-violet (UV) sensor, or a touch sensor arranged on a temple of the active eyewear.

The electronic components 18 may comprise an optical element for performing augmented reality, for instance a display, a holographic mirror or a light optical element (LOE).

The electronic components 18 may comprise an active cell, such as an electrochromic cell or an optical power tunable cell.

The electronic components 18 may comprise an active lens. For instance, the lens housing 12 of the eyewear skeleton 10 may comprise electrochromic lenses and the electronic drivers of the lenses.

The eyewear skeleton 10 may comprise mechanical means arranged between the electronics components 18 and the at least two elements. More precisely, the mechanical means may be adapted to position and maintain the electronics components 18 on the elements.

The mechanical means may comprise hinges, such as spring hinges, or wires, or holding means, such as means for holding the optical lenses, or temple mechanical means for supporting at least one electronic component 18.

Some characteristics of the eyewear skeleton may be linked to the dressing elements and to the wearer. For instance, the lens housing 12 may be linked to the size of the lenses and to the distance between the lenses. Plus, the eyewear skeleton 10 may be linked to the pantoscopic angle fitting the wearer's face and/or the wrap angle fitting the wearer's face.

At least one of the at least two elements of the eyewear skeleton 10 may be adjustable. In other words, at least one element of the eyewear skeleton 10 may be adjusted so that the eyewear skeleton is adapted to a wearer.

Figure 3:
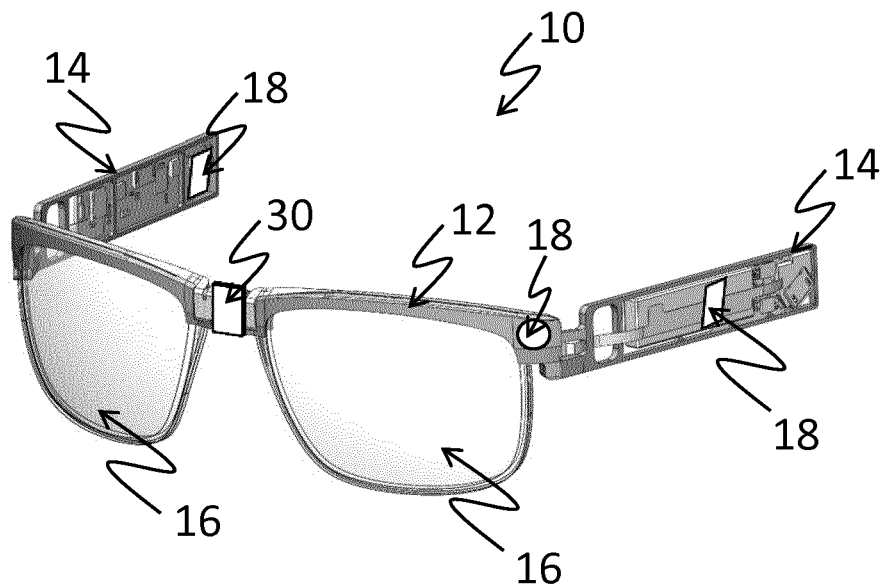
FIGS. 3 and 4 represent eyewear skeletons comprising mechanical means for adjusting the eyewear skeletons to the wearer according to embodiments of the invention.
Figure 4:
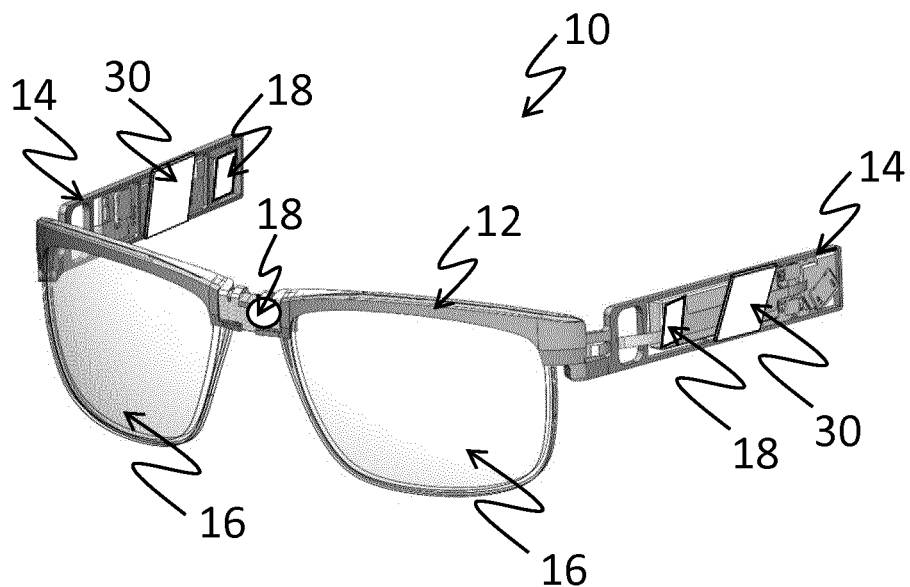

Eyewear skeletons 10 comprising at least one adjustable element are represented in FIGS. 3 and 4.

The eyewear skeleton 10 may comprise mechanical means 30 for adjusting at least one element of the eyewear skeleton 10 according to at least one parameter of the wearer. More precisely, the eyewear skeleton 10 may be fitted to the wearer.

As represented in FIG. 3, the lens housing 12 of the eyewear skeleton 10 is adjustable and comprises mechanical means 30 for adjusting the lens housing width according to the width of the face of the wearer. The mechanical means 30 may comprise a kneecap, or a sliding system. A sliding system allows adjusting the lens housing width, and thus the distance between the optical lenses, to the interpupillary distance of the wearer for a binocular system, or to an image display system position for an augmented-reality active eyewear.

Each temple 14 of the eyewear skeleton 10 represented in FIG. 4 is adjustable and comprises mechanical means 30, for instance a sliding system, for adjusting the temple length to a wearer.

The element of the eyewear skeleton 10 may be adjusted according to the curvature angle of the wearer, or to the interpupillary-distance of the wearer, or to a parameter relative to the head of the wearer, such as the nose size of the wearer, the nose position of the wearer, an eyebrow position of the wearer, or a jowl position of the wearer, or a parameter relative to the wearer's head movements.

The element of the eyewear skeleton 10 may be adjusted according to the pantoscopic angle fitting the wearer's face. For instance, the eyewear skeleton 10 may be adjusted to a wearer with a mechanical vertical rotation on the bridge part of the lens housing 12 of the eyewear skeleton 10.

The element of the eyewear skeleton 10 may be adjusted according to the wrap angle fitting the wearer's face. For instance, the eyewear skeleton 10 may be adjusted to a wearer with a horizontal rotation at the fixation between the lens housing 12 and one temple 14 of the eyewear skeleton 10.

The element of the eyewear skeleton 10 may be adjusted according to the width of the wearer's head. For instance, the eyewear skeleton 10 may be adjusted to the width of the head of the wearer with mechanical translation means arranged to change the distance between the right and left part of the lens housing 12, or to change the horizontal position of the contact between the lens housing and the face of the wearer.

The lens housing 12 and the temples 14 of the eyewear skeleton 10 may comprise mechanical means for adjusting the eyewear skeleton 10 to the optical lenses to be provided to the wearer. For instance, the lens housing 12 may be adjusted to the size of the lenses and to the distance between the lenses.

The eyewear skeleton may be adjusted to place correctly a sensor, for instance a blink sensor, or a gaze-direction sensor, or an electrooculography sensor, relative to the wearer's head or to the wearer's eye.

Advantageously, the eyewear skeleton is easily adjusted to the wearer, for instance to the wearer's face or to the wearer's preferences and allows obtaining an active eyewear more adapted to the wearer, and thus allows improving the comfort of the wearer.

The eyewear skeleton 10 may be autonomous. More precisely, the eyewear skeleton 10 may be functional, even if not dressed by a dressing element.

The invention further relates to an active eyewear adapted for a wearer.

Figure 5:
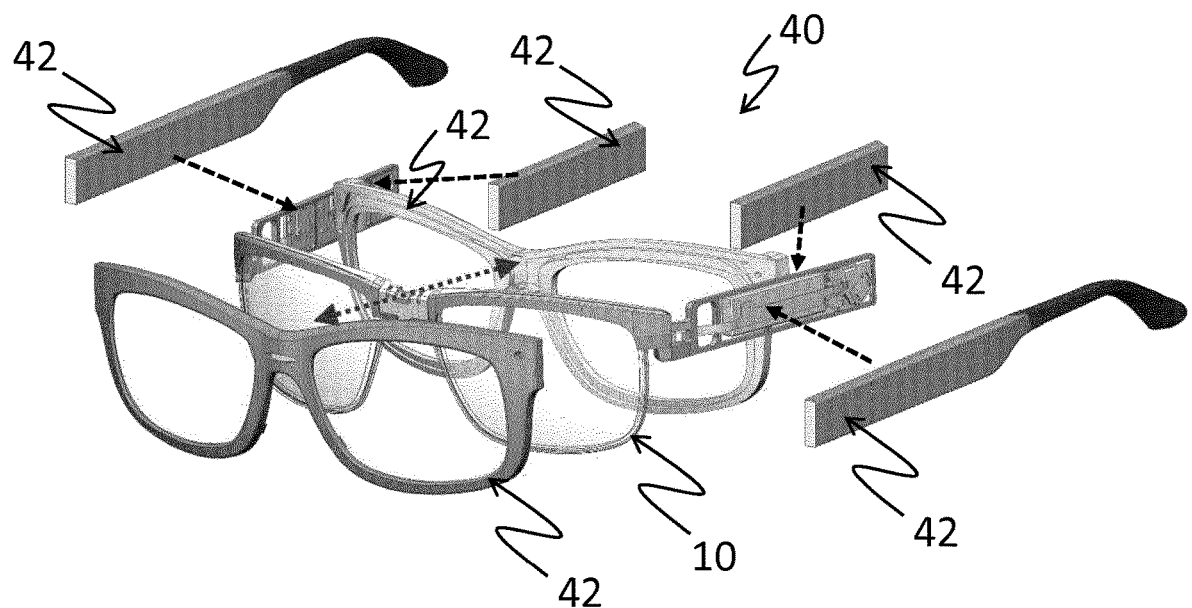
FIGS. 5 and 6 represent views of unassembled active eyewear according to embodiments of the invention.
Figure 6:
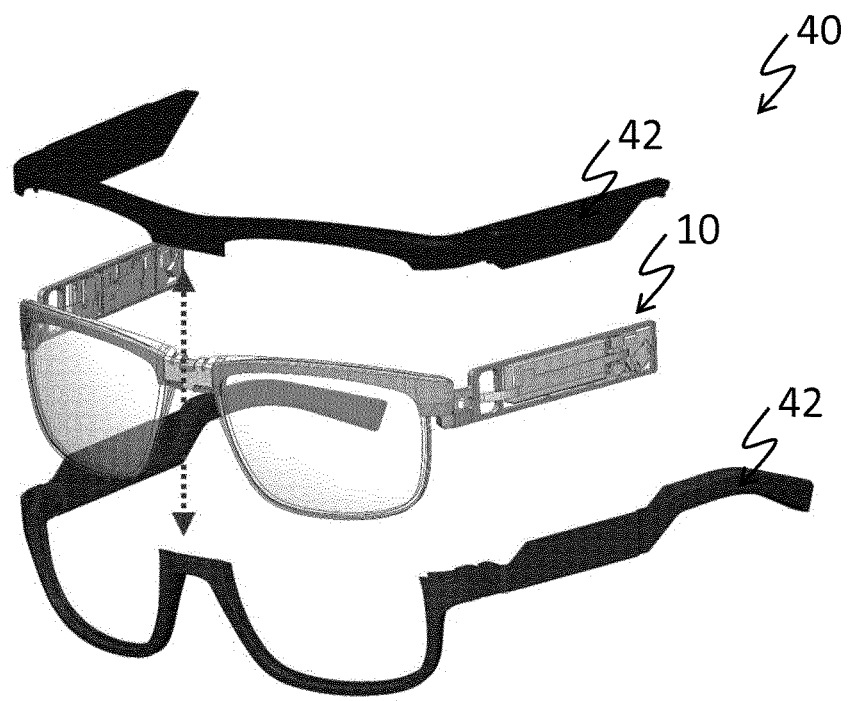

Disassembled active eyewears 40 according to embodiments of the invention are represented in FIGS. 5 and 6.

The active eyewear 40 comprises the eyewear skeleton 10 as described previously and at least one dressing element 42.

A dressing element, also called a cover, dresses at least part of an element of the eyewear skeleton.

Advantageously, the electronic components of the elements of the eyewear skeleton are easily integrated in the active eyewear, regardless the shape of the dressing element.

For instance, in FIGS. 5 and 6, the same eyewear skeleton 10 is represented, but the eyewear skeleton 10 of FIG. 5 is intended to be dressed by different dressing elements than the eyewear skeleton 10 of FIG. 6.

The wearer of the active eyewear 40 may choose an eyewear skeleton among a plurality of eyewear skeletons. The eyewear skeleton 10 may be identified by the optical lenses shape to be supported by the lens housing 12, by distance between the optical lenses to be supported by the lens housing 12, by the pantoscopic angle fitting the wearer's face, or by the wrap angle fitting the wearer's face.

Advantageously, the active eyewear is easily adjusted to the wearer, for instance to the wearer's face or to the wearer's preferences.

Plus, the wearer can choose the electronic components of the eyewear skeleton according to his needs and/or preferences, and such electronic components are easily integrated in the active eyewear.

The wearer of the active eyewear 40 may choose one or more dressing elements among a plurality of dressing elements. Different dressing elements may dress at least a part of an eyewear skeleton. Advantageously, having different dressing elements for dressing the same part of an eyewear skeleton allows guarantying to the wearer a freedom in the design of his active eyewear 40.

Furthermore, the active eyewear is more adapted to the wearer's needs and preferences, since the eyewear skeleton is dressed by one or more dressing elements which can be from different shape, color or material for instance according to the wearer's choices.

The active eyewear 40 comprising an eyewear skeleton 10 separated from a dressing element 42 allows having the eyewear skeleton and the dressing element to be manufactured at different location.

The active eyewear 40 may comprise a plurality of dressing elements, each dressing element dressing at least part of an element of the eyewear skeleton 10. For instance, on FIG. 5, the active eyewear 40 comprises three dressing elements 42, and on FIG. 6, the active eyewear 40 comprises two dressing elements 42. A dressing element 42 may dress partially the eyewear skeleton 10, as represented in FIGS. 5 and 6.

The active eyewear 40 may comprise a first dressing element 42 having a first configuration and a second dressing element 42 having a second configuration different from the second configuration. A configuration may comprise parameters relative to a material, a color, a number of parts, a shape, or fixation means to the eyewear skeleton 10. At least one parameter of the first configuration is different from the parameters of the second configuration.

A dressing element 42 allows providing the external shape of the eyewear skeleton 10. More precisely, a dressing element 42 allows isolating the eyewear skeleton 10 from external aggression, such as dust or rain. A dressing element 42 may waterproof the eyewear skeleton 10 when dressing it.

A dressing element 42 may be identified by a material, a color, a shape, a number of part, the length of the temples, or the fixation means between the dressing element 42 and the eyewear skeleton 10. The wearer of the active 40 may choose a dressing element 42 intended to dress the eyewear skeleton 10 adapted to him.

A dressing element 42 may be made of plastic, for instance thermoplastics, of acetate, of metal, for instance titanium, steel, aluminum, of elastomer, of wood, or of any material commonly used in eyewear manufacturing. A dressing element may be made of a sealing resin, such as epoxy or silicone, for instance to waterproof the eyewear skeleton 10 when dressing it.

A dressing element 42 may be adjusted according to the eyewear skeleton 10. For example, the dressing element 42 may be made of a flexible material so as to facilitate the dressing of the dressing element 42 on the element of the eyewear skeleton 10. A first part of the dressing element 42 may be made of rigid material, and second part of the dressing element 42 may be made of flexible material.

A dressing element 42 may be adjustable, for instance according to at least one parameter of the wearer. More precisely, the dressing element 42 may be adjusted according to the wearer, for instance depending on the wearer's choices.

A dressing element 42 may be adjusted according to the position of the eyewear skeleton relative to the wearer, or to wearer's preferences.

The active eyewear 40 may form a frame comprising the eyewear skeleton 10 and at least one dressing element 42. The dressing element 42 may be adjusted according to the pantoscopic angle fitting the wearer's face, or to the wrap angle fitting the wearer's face.

A dressing element 42 may be adjusted according to the length of the temples of the eyewear skeleton 10, or to the distance between the temples of the eyewear skeleton 10.

A dressing element 42 may comprise nose pads arranged to rest on the nose of the wearer when the active eyewear is worn by the wearer, or right and left temples, or ears supports.

The dressing element 42 may be monobloc. The dressing element 42 may comprise two or more parts.

As represented in FIG. 5, the active eyewear 40 comprises three dressing elements 42, namely a right temple dressing element, a left temple dressing element and a lens housing dressing element. The dressing element 42 arranged on the lens housing 12 comprise two parts. A first part of the lens housing dressing element 42 is arranged to dress the external part of the eyewear skeleton 10, namely the part of the eyewear skeleton opposite to the part of the eyewear skeleton on the side of the wearer when the active eyewear is worn by the wearer, and a second part of the lens housing dressing element 42 is arranged to dress the internal part of the eyewear skeleton 10, namely the part of the eyewear skeleton on the side of the wearer when the active eyewear is worn by the wearer. Each dressing element 42 arranged on the right and left temples 14 comprise two parts. A first part of the dressing element 42 is arranged to dress the external part of the eyewear skeleton 10, and a second part of the dressing element 42 is arranged to dress the internal part of the eyewear skeleton 10. The first part of the dressing element 42 may comprise the tip of the temple. The tip of the temple is arranged to fit around the ears of a wearer when the active eyewear 40 is worn by the wearer.

Two parts of a dressing element 42 may be fixed together so that the two parts of the dressing element dress at least part of the elements of the eyewear skeleton 10. For instance, two parts of a dressing element 42 may be screwed, or clamped, or glued, or clipped together.

The dressing element 42 may be designed to allow the deformation of the eyewear skeleton 10, when the eyewear skeleton 10 comprises adjustable elements.

A dressing element 42 may be fixed on the eyewear skeleton 10. For instance, the dressing element 42 may be screwed, or clamped, or glued, or clipped on the eyewear skeleton 10.

A dressing element 42 is advantageously easily replaceable, so as the active eyewear 40 may be easily adapted to the wearer's preferences, when the wearer's preferences change over time.

A dressing element 42 may comprise at least one aperture 44 arranged on an area of the dressing element dressing an electronic component 18.

The aperture 44 allows an electronic component 18, such as an ambient light sensor, or an eye-tracking device, directly sensing a parameter. In other words, the aperture 44 is arranged so that the electronic component 18 may sense a parameter, such as the gaze-direction of the wearer, or the ambient light.

The aperture 44 is arranged so as to easily change an electronic component 18, for instance the battery, of the eyewear skeleton 10.

The dressing element 42 may completely dress the eyewear skeleton 10. In the sense of the invention, the term "completely" means that a dressing element dresses entirely at least a part of the eyewear skeleton, except the aperture 44 arranged on an area of the dressing element dressing an electronic component 18.

The invention further relates to a method for assembling the active eyewear adapted for a wearer as described previously.

Figure 7:
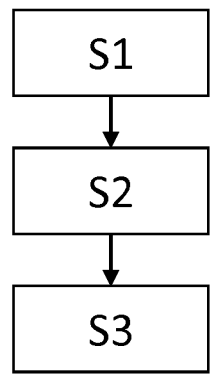
FIG. 7 is a flowchart of the different steps of a method for assembling an active eyewear adapted for a wearer according to the invention.

A flowchart of the different steps of the method for assembling the active eyewear adapted for a wearer according to the invention is represented in FIG. 7.

The method of assembling comprises an eyewear skeleton providing step S1, during which an eyewear skeleton as described previously is provided. The eyewear skeleton comprises at least two elements selected among a lens housing, at least one temple, and at least one optical lens.

The method of assembling comprises a dressing element providing step S2, during which at least one dressing element as described previously is provided. The dressing element may comprise at least two parts.

The method of assembling comprises a dressing step S3, during which at least part of the at least two elements of the eyewear skeleton are dressed by the at least one dressing element.

During the dressing step S3, at least one of the elements of the eyewear skeleton may be at least partially dressed by one of the parts of the dressing element, and at least the other of the elements of the eyewear skeleton may be at least partially dressed by the other of the parts of the dressing element. The parts of the dressing element may dress completely the two elements of the eyewear skeleton.

As illustrated in FIGS. 5 and 6, the dotted arrows represent the assembling of the dressing elements 42, or of the parts of the dressing elements 42, on the eyewear skeleton 10.

In FIG. 5, the active eyewear 40 comprises an eyewear skeleton 10 and three dressing elements 42. A dressing element 42 is intended to dress entirely the right temple of the eyewear skeleton 10, another dressing element 42 is intended to dress entirely the left temple of the eyewear skeleton 10, and the other dressing element 42 is intended to dress entirely the lens housing of the eyewear skeleton and part of the optical lenses. The right, left and front part of the eyewear skeleton are defined relative to the wearer, when the active eyewear is worn by the wearer.

In FIG. 6, the active eyewear 40 comprises an eyewear skeleton 10 and two dressing elements 42. A dressing element 42 is intended to dress the lower part of the eyewear skeleton 10, and the other dressing element 42 is intended to dress the upper part of the eyewear skeleton 10. The upper and lower part of the eyewear skeleton are defined relative to the wearer, when the active eyewear is worn by the wearer. Each dressing element is intended to dress part of the lens housing, part of the right and left temples, and part of the optical lenses, such that the right and left temples and the lens housing are entirely dressed by the dressing elements.

The invention further relates to a method for adjusting an active eyewear to a wearer as described previously.

Figure 8:
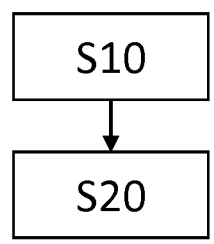
FIG. 8 is a flowchart of the different steps of a method for adjusting an active eyewear to a wearer according to the invention.

A flowchart of the different steps of the method for adjusting an active eyewear to a wearer according to the invention is represented in FIG. 8.

The method of adjusting comprises an active eyewear providing step S10, during which an active eyewear as described previously is provided. The active eyewear comprises an eyewear skeleton comprising at least two elements selected among a lens housing, at least one temple, and at least one optical lens, and at least one dressing element. At least one of the elements of the eyewear skeleton and/or the dressing element is adjustable.

The method of adjusting comprises an active eyewear adjusting step S20, during which the at least one of the elements of the eyewear skeleton and/or the dressing element is adjusted according to at least one parameter of the wearer.

For instance, one of the elements of the eyewear skeleton may be adjustable, and the eyewear skeleton may comprise mechanical means. During the active eyewear adjusting step S20, the element of the eyewear skeleton is adjusted with the mechanical means according to at least one parameter of the wearer.

The invention has been described above with the aid of embodiments without limitation of the general inventive concept. Moreover, the embodiments of the invention may be combined without any restriction.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. An eyewear skeleton to be integrated into an active eyewear adapted for a wearer, comprising:
   a mechanical device; and
   at least two elements comprising a lens housing and a temple coupled together,
   at least part of the two elements being configured to be dressed by at least one dressing element,
   wherein each of the at least two elements of the eyewear skeleton comprises at least one electronic component, each electronic component of the elements being configured to interact with one other electronic component arranged on another element of the eyewear skeleton,
   wherein the mechanical device is arranged between the electronics components and the at least two elements and maintains the electronic components of the at least two elements, and
   wherein the mechanical device is configured to adjust at least the lens housing and/or the temple according to at least one parameter of the wearer, the at least one parameter of the wearer relates to a wrap angle fitting the wearer's face and/or a curvature angle of the wearer and/or an interpupillary-distance of the wearer and/or a parameter relative to a head of the wearer, the parameter relative to the head of the wearer including a nose size and/or a nose position and/or an eyebrow position and/or a jowl position, and/or a width of the wearer's head and/or a parameter relative to the wearer's head movements.

2. The eyewear skeleton according to claim 1, wherein at least one of the electronic components comprises a battery and/or an electronic board and/or a wire and/or a sensor and/or an optical element for performing augmented reality and/or a memory and/or a processor and/or a cooling component and/or an active cell.

3. The eyewear skeleton according to claim 1, wherein at least one of the at least two elements is adjustable so that the eyewear skeleton is adapted to the wearer.

4. An active eyewear adapted for a wearer comprising:
   the eyewear skeleton according to claim 1; and
   the at least one dressing element, which dresses at least part of the at least two elements of the eyewear skeleton.

5. The active eyewear according to claim 4, wherein the at least one dressing element is adjusted according to at least one parameter of the wearer.

6. The active eyewear according to claim 4, wherein the at least one dressing element comprises at least two parts.

7. The active eyewear according to claim 4, wherein the at least one dressing element is fixed on the eyewear skeleton.

8. The active eyewear according to claim 4, wherein the at least one dressing element comprises at least one aperture arranged on an area of the at least one dressing element dressing an electronic component.

9. The eyewear skeleton according to claim 1, wherein the mechanical device is configured to adjust at least the lens housing and/or the temple according to the at least one parameter of the wearer, the at least one parameter of the wearer relates to the wrap angle fitting the wearer's face and the curvature angle of the wearer and the interpupillary-distance of the wearer and the parameter relative to the head of the wearer.

10. The eyewear skeleton according to claim 1, wherein the parameter relative to the head of the wearer includes the nose size and the nose position and the eyebrow position and the jowl position, and the width of the wearer's head and the parameter relative to the wearer's head movements.

11. The eyewear skeleton according to claim 1, wherein at least one of the electronic components comprises an optical element for performing augmented reality.

12. The eyewear skeleton according to claim 1, wherein the mechanical device maintains the electronic components of the at least two elements by supporting the electronic components via hinges or wires.

13. A method for assembling an active eyewear adapted for a wearer, an eyewear skeleton being integrated into the active eyewear and comprising
- a mechanical device, and
- at least two elements comprising a lens housing and a temple coupled together,
- at least part of the two elements being configured to be dressed by at least one dressing element,
- wherein each of the at least two elements of the eyewear skeleton comprises at least one electronic component, each electronic component of the elements being configured to interact with one other electronic component arranged on another element of the eyewear skeleton,
- wherein the mechanical device is arranged between the electronics components and the at least two elements and maintains the electronic components of the at least two elements, and
- wherein the mechanical device is configured to adjust at least the lens housing and/or the temple according to at least one parameter of the wearer, the at least one parameter of the wearer relates to a wrap angle fitting the wearer's face and/or a curvature angle of the wearer and/or an interpupillary-distance of the wearer and/or a parameter relative to a head of the wearer, the parameter relative to the head of the wearer including a nose size and/or a nose position and/or an eyebrow position and/or a jowl position, and/or a width of the wearer's head and/or a parameter relative to the wearer's head movements, the method comprising:
- dressing at least part of the at least two elements of the eyewear skeleton by the at least one dressing element.

14. The method for assembling according to claim 13, wherein the at least one dressing element comprises at least two parts, wherein during the dressing, at least one of the at least two elements of the eyewear skeleton is at least partially dressed by one of the at least two parts of the at least one dressing element, and at least the other of the at least two elements of the eyewear skeleton is at least partially dressed by the other of the at least two parts of the at least one dressing element, such that the at least two parts of the at least one dressing element dresses the at least two elements of the eyewear skeleton.

15. A method for adjusting an active eyewear to a wearer, an eyewear skeleton being integrated into the active eyewear and comprising
- a mechanical device, and
- at least two elements comprising a lens housing and a temple coupled together,
- at least part of the two elements being configured to be dressed by at least one dressing element,
- wherein each of the at least two elements of the eyewear skeleton comprises at least one electronic component, each electronic component of the elements being configured to interact with one other electronic component arranged on another element of the eyewear skeleton,
- wherein the mechanical device is arranged between the electronics components and the at least two elements and maintains the electronic components of the at least two elements, and
- wherein the mechanical device is configured to adjust at least the lens housing and/or the temple according to at least one parameter of the wearer, the at least one parameter of the wearer relates to a wrap angle fitting the wearer's face and/or a curvature angle of the wearer and/or an interpupillary-distance of the wearer and/or a parameter relative to a head of the wearer, the parameter relative to the head of the wearer including a nose size and/or a nose position and/or an eyebrow position and/or a jowl position, and/or a width of the wearer's head and/or a parameter relative to the wearer's head movements, the method comprising:
- adjusting the at least one of the at least two elements of the eyewear skeleton and/or the at least one dressing element according to at least one parameter of the wearer.

16. The method for adjusting according to claim 15, wherein at least one of the at least two elements of the eyewear skeleton is adjustable, and during the adjusting, the at least one of the at least two elements of the eyewear skeleton is adjusted with the mechanical device according to the at least one parameter of the wearer.

* * * * *